United States Patent
Mori (10) Patent No.: US 6,603,591 B2
(45) Date of Patent: Aug. 5, 2003

(54) MICROMINIATURE MOVABLE DEVICE (75) Inventor: Keiichi Mori, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 0 days.

(21) Appl. No.: 10/102,231

(22) Filed: Mar. 19, 2002

(65) Prior Publication Data
US 2002/0141038 A1 Oct. 3, 2002

(30) Foreign Application Priority Data

Mar. 29, 2001 (JP) ........................................ 2001-095841

(51) Int. Cl.[7] .............................................. G02B 26/00
(52) U.S. Cl. .......................... 359/295; 359/291; 359/223
(58) Field of Search ................................ 359/290, 291, 359/295, 298, 223, 224

(56) References Cited

U.S. PATENT DOCUMENTS

| | | | |
|---|---|---|---|
| 5,551,293 A | | 9/1996 | Boysel et al. ............. 73/514.14 |
| 5,793,519 A | * | 8/1998 | Furlani et al. ............... 359/291 |
| 5,907,425 A | * | 5/1999 | Dickensheets et al. ...... 359/224 |
| 5,999,303 A | * | 12/1999 | Drake ......................... 359/224 |
| 6,323,982 B1 | * | 11/2001 | Hornbeck ................... 359/224 |
| 6,431,714 B1 | * | 8/2002 | Sawada et al. ............. 359/224 |
| 2003/0007235 A1 | * | 1/2003 | Yoon ........................... 359/290 |

FOREIGN PATENT DOCUMENTS

| | | |
|---|---|---|
| EP | 0419853 | 4/1991 |
| EP | 0725408 | 8/1996 |
| JP | 8339939 | 12/1996 |
| JP | 10162713 | 6/1998 |

OTHER PUBLICATIONS

Kato, et al., "Development of 4×4 MEMS optical switch," IEEE/LEOS International Conference on Optical MEMS, Kauai, HI, Aug. 21–24, 2000, pp. 95–96. (2000).

* cited by examiner

Primary Examiner—Evelyn Lester
(74) Attorney, Agent, or Firm—David N. Lathrop, Esq.; Gallagher & Lathrop

(57) ABSTRACT

On the top of a central protrusion 81 of a stationary electrode substrate 80 there is formed a stationary electrode 84A. A movable electrode plate 12 is supported at both sides thereof to a support frame 10 through flexures 19 and anchor parts 11. The movable electrode plate 12 is held displaceable vertically to the stationary electrode 12. The marginal edge of the protrusion 81 merges into a sloping face, on which an auxiliary electrode 84B is formed. In the case of separating the movable electrode plate 12 from the stationary electrode 84a, a voltage is applied between them.

10 Claims, 6 Drawing Sheets

MICROMINIATURE MOVABLE DEVICE

BACKGROUND OF THE INVENTION

The present invention relates to a microminiature movable device and, more particularly, to a microminiature movable device in which an auxiliary electrode is formed on a stationary substrate together with a stationary electrode to prevent a movable electrode plate from sticking or adhering to the stationary substrate.

Figure 1A:
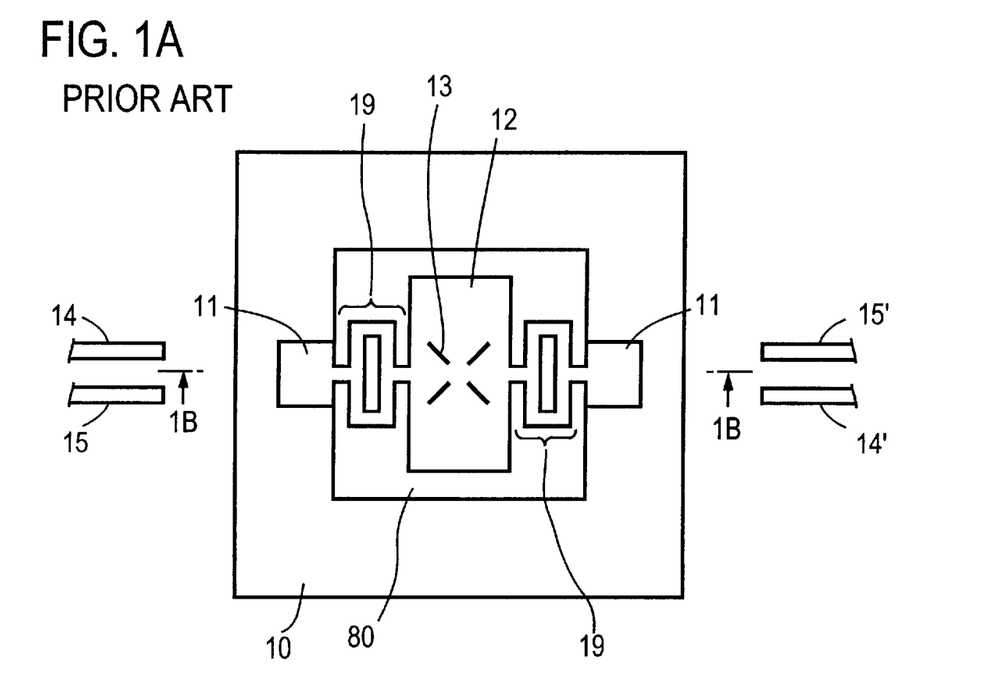
FIG. 1A is a plan view for explaining an example of a conventional microminiature movable device applied to an optical switch.
Figure 1B:
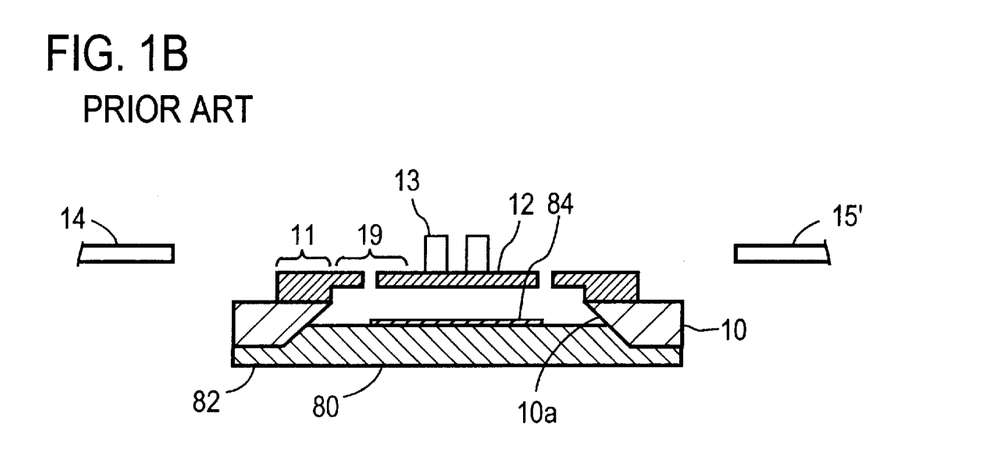
FIG. 1B is a sectional view of the microminiature movable device taken along the line 1B—1B in FIG. 1A.

To facilitate a better understanding of the present invention, a description will be given first, with reference to FIGS. 1A and 1B, of a prior art example of a microminiature movable device.

The illustrated microminiature movable device is manufactured using a silicon (Si) single crystal wafer as the starting substrate through application of micromachining technology including thin-film growth, photolithography and etching techniques. The silicon single crystal wafer is ultimately machined into such a square support frame 10 as depicted in FIGS. 1A and 1B. The support frame 10 has formed integrally therewith anchor parts 11 located centrally on a pair of opposed sides of the frame, flexures 19 extended inwardly from the anchor parts 11 and a rectangular movable electrode plate 12 connected centrally at its both sides to inner ends of the flexures 19.

On the top of the movable electrode plate 12 there are formed four micro-mirrors 13 having their reflecting surfaces held perpendicular to the movable electrode plate 12. Reference numeral 10a denotes a countersink bored through the support frame 10. Fixedly mounted on the underside of the support frame 10 in a manner to cover the countersink 10a is a stationary electrode substrate or plate 80 with a film-formed stationary electrode 84 on the top thereof, the stationary electrode plate 80 being in spaced parallel relation to the movable electrode plate 12. Reference numerals 14 and 14' denote output optical fibers or optical waveguides, and 15 and 15' denote input optical fibers or optical waveguides. Incidentally, FIGS. 1A and 1B show the case where the miniature movable device is an optical switch.

Now, the operation of the optical switch will be described below with reference to FIGS. 2A to 2D.

Figure 2A:
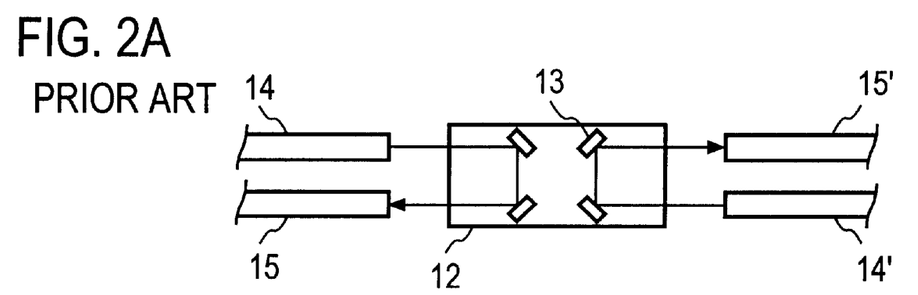
FIG. 2A is a plan view for explaining the operation of the conventional microminiature movable device applied to the optical switch.
Figure 2B:
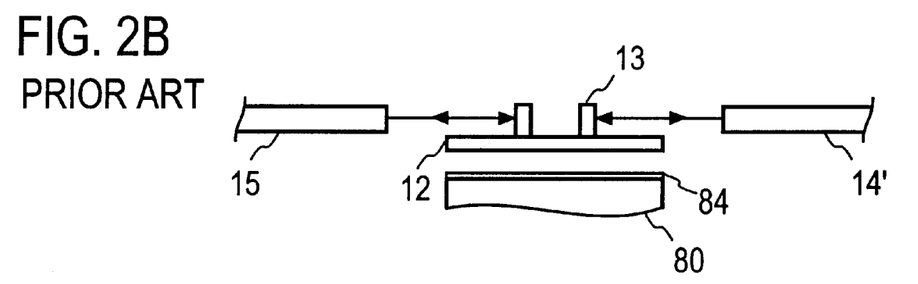
FIG. 2B is a side view of the optical switch for explaining its operation.

Referring first to FIGS. 2A and 2B, light transmitted over the input optical fibers 14 and 14' is emitted from their end faces, and propagate through the space to the micro-mirrors 13, by which it is reflected for incidence on the output optical fibers 15 and 15'. This state will hereinafter referred to as a steady state.

Figure 2C:
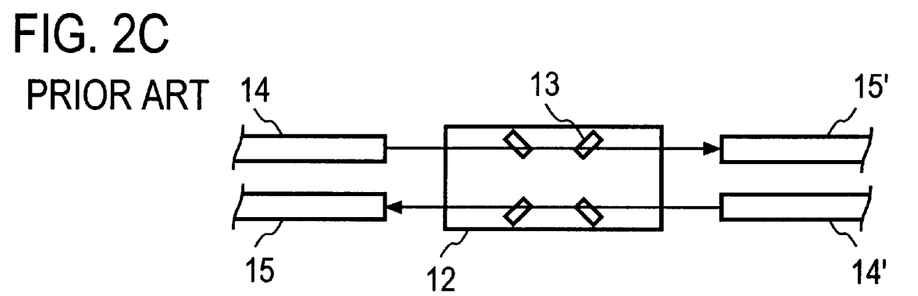
FIG. 2C is a plan view of the optical switch for explaining its operation.
Figure 2D:
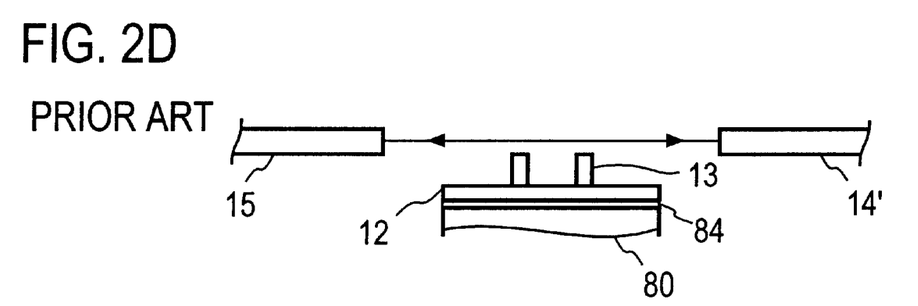
FIG. 2D is a side view of the optical switch for explaining its operation.

Turning next to FIGS. 2C and 2D, when a voltage is applied across the stationary electrode 84 and the movable electrode plate 12 to generate therebetween static electricity in a direction in which they attract each other, the movable electrode plate 12 is driven downwardly, by which the flexures 19 are elastically deformed, and consequently, the movable electrode plate 12 is displaced downward. The micro-mirrors 13 formed on the top of the movable electrode plate 12 are also displaced downward, and hence they go down below the optical paths of the light emitted from the end faces of the input optical fibers 14 and 14'. In this case, the light emitted from the end face of the input optical fiber 14 is no longer intercepted by the micro-mirrors 13, and it travels in a straight line and impinges on the output optical fiber 15'. Similarly, the light emitted from the light emitted from the end face of the input optical fiber 14' strikes on the output optical fiber 15. In this way, the optical paths to the output optical fibers 15 and 15' can be switched spatially without using solid optical waveguides as of transparent synthetic resin.

In the above-described microminiature movable device, the movable electrode plate 12 and the flexures 19 are both so thin, in general, that they are small in their elastic restoring force. And, the underside of the movable electrode plate 12 is smooth, whereas the top of the stationary electrode 84 is also smooth and is stained and moist as well, allowing polarization in the electrode surface and generating van der Waals forces, too. Under these conditions, when the movable electrode plate 12 is displaced downward to bring its underside into contact with the top of the stationary electrode 84, they adhere to each other and do not separate immediately, sometimes disturbing smooth switching operation. Incidentally, such adhesion can be avoided, for example, by roughening either one or both of the underside surface of the movable electrode plate 12 and the top surface of the stationary electrode 84. However, roughening either one or both of the two contacting surfaces involves some additional process steps, and hence it introduces complexity in the manufacture of the microminiature movable device.

SUMMARY OF THE INVENTION

It is therefore an object of the present invention to provide a microminiature movable device adapted so that the movable electrode plate, when brought into contact with the stationary electrode, can be separated therefrom relatively easily.

The microminiature movable device according to the present invention comprises:

A microminiature movable device comprising:
- a stationary electrode substrate having a centrally-disposed protrusion with a stationary electrode formed on its top;
- auxiliary electrode means formed on said stationary electrode substrate at a position adjacent said protrusion and at a level lower than said stationary electrode;
- a movable electrode part having an area opposite said stationary electrode and said auxiliary electrode means;
- at least two flexures resiliently supporting at one end said movable electrode part at at least two places of its marginal edge; and
- a support frame secured to said stationary electrode substrate, for fixedly supporting the other ends of said flexures to hold said movable electrode plate so that it can be engaged with or disengaged from said stationary electrode.

DETAILED DESCRIPTION OF THE PREFERRED EMBODIMENTS

With reference to the accompanying drawings, embodiments of the present invention will be described below.

Referring first to FIGS. 3A to 3J, a description will be given first of the steps involved in the manufacture of an optical switch using a silicon single-crystal wafer as the starting substrate through application of micromachining techniques such as thin film forming, photolithography and etching techniques.

Step S1 (FIG. 3A): Prepare a silicon single-crystal wafer 10' that is a starting substrate.

Step S2 (FIG. 3B): Form a silicon dioxide ($SiO_2$) protective film 17 to a thickness of several micrometers ($\mu$m) over the entire area of the top of the silicon single-crystal wafer 10'.

Step S3 (FIG. 3C): Form a poly-Si film 16 all over the top of the silicon dioxide protective film 17.

Step S4 (FIG. 3D): Remove selected areas of the poly-Si film 16 by photolithography and etching techniques to form the anchor parts 11, the flexures 19 and the movable electrode plate 12 depicted in FIGS. 1A and 1B.

Step S5 (FIG. 3E): Coat the entire structure of the silicon single-crystal wafer 10' with a second silicon dioxide protective film 16'.

Step S6 (FIG. 3F): Remove that area 12A of the second silicon dioxide protective film 16' on the underside of the silicon single-crystal wafer 10' which corresponds to the area where the anchor parts 11, the flexures 19 and the movable electrode plate 12 are formed.

Step S7 (FIG. 3G): Mold micro-mirrors 13 of photosensitive resin on the top of the movable electrode plate 12, and coat the surface of each micro-mirror 13 with a thin gold (Au) film.

Step S8 (FIG. 3H): Dip the wafer assembly in a potassium hydroxide (KOH) aqueous solution to etch away the exposed region of the silicon single-crystal wafer 10' to form therethrough the countersink 10a where to allow vertical movement of the movable electrode plate 12. Thus, the support frame 10 is obtained.

Step S9 (FIG. 3I): Remove the remaining silicon dioxide film 16'.

Step S10 (FIG. 3J): Firmly join the stationary electrode substrate 80 to the underside of the support frame 10 as shown, the stationary electrode substrate 80 being fabricated as described below.

Turning next to FIGS. 4A to 4F, a description will be given of the fabrication of the stationary electrode substrate 80 using a silicon single-crystal wafer as the starting substrate.

Step S1 (FIG. 4A): prepare a silicon single-crystal wafer 80' that is a starting substrate.

Step S2 (FIG. 4B): Form a silicon dioxide ($SiO_2$) protective film 82 to a thickness of several micrometers ($\mu$m) over the entire area of the top of the silicon single-crystal wafer 80'.

Step S3 (FIG. 4C): Remove the silicon dioxide film 82 of the area other than that where a central protrusion 81 is to be provided.

Step S4 (FIG. 4D): Dip the silicon single-crystal substrate assembly in a potassium hydroxide aqueous solution to etch away the exposed region of the wafer 80' to form the central protrusion 81, then remove the remaining silicon dioxide film 82 to obtain the stationary electrode substrate 80. Since the silicon single-crystal undergoes directional etching, the central protrusion 81 merges into a sloping face 85. The central protrusion 81 including the peripheral sloping face 85 is formed in an area corresponding to the movable electrode plate 12 as depicted in FIG. 3J.

Step S5 (FIG. 4E): Form a silicon dioxide film 83 as an insulating film over the entire surface area of the stationary electrode substrate 80 formed in step S4.

Step S6 (FIG. 4F): Form a thin film of gold all over the surface of the silicon dioxide insulating film 83 of the stationary electrode substrate 80, and provide a stationary electrode A on the top of the central protrusion 81 and an auxiliary electrode 84B on the slope 85 by patterning the thin film 83.

Figure 3A:
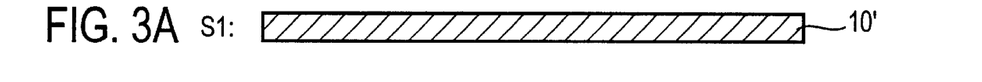
FIG. 3A is a sectional view for explaining a first step of the manufacturing operation process of a movable electrode plate (12) assembly of the microminiature movable device according to the present invention.
Figure 3B:
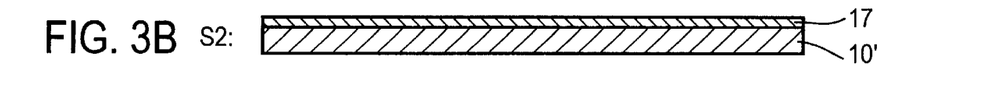
FIG. 3B is a sectional view for explaining a second step of the movable electrode plate assembly manufacturing operation process.
Figure 3C:
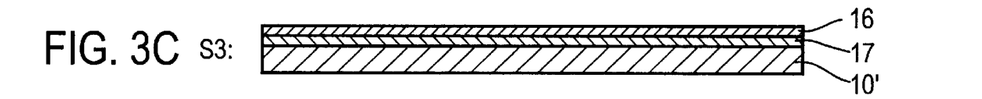
FIG. 3C is a sectional view for explaining a third step of the movable electrode plate assembly manufacturing operation process.
Figure 3D:
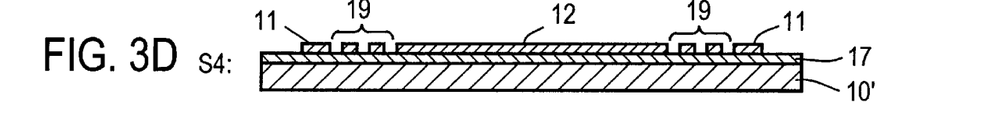
FIG. 3D is a sectional view for explaining a fourth step of the movable electrode plate assembly manufacturing operation process.
Figure 3E:
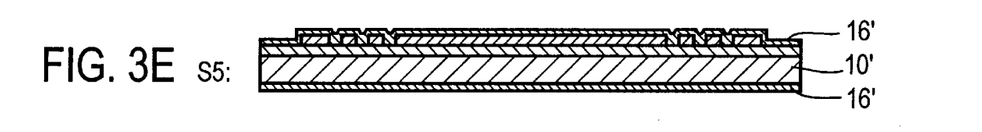
FIG. 3E is a sectional view for explaining a fifth step of the movable electrode plate assembly manufacturing operation process.
Figure 3F:
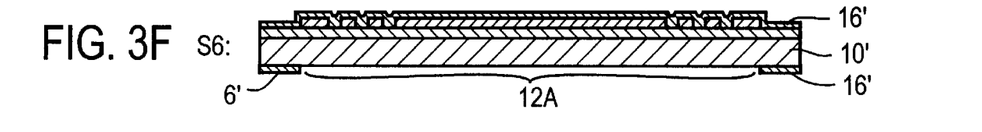
FIG. 3F is a sectional view for explaining a sixth step of the movable electrode plate assembly manufacturing operation process.
Figure 3G:
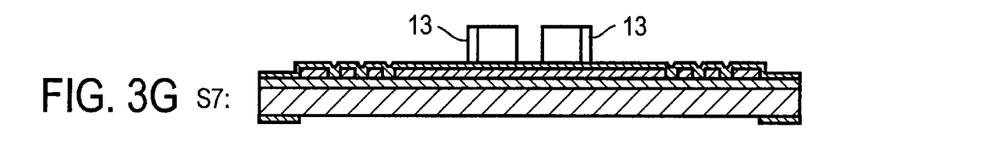
FIG. 3G is a sectional view for explaining a seventh step of the movable electrode plate assembly manufacturing operation process.
Figure 3H:
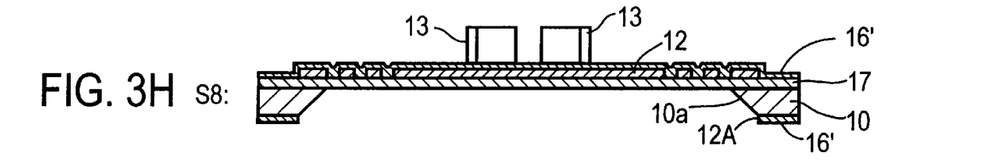
FIG. 3H is a sectional view for explaining an eighth step of the movable electrode plate assembly manufacturing operation process.
Figure 3I:
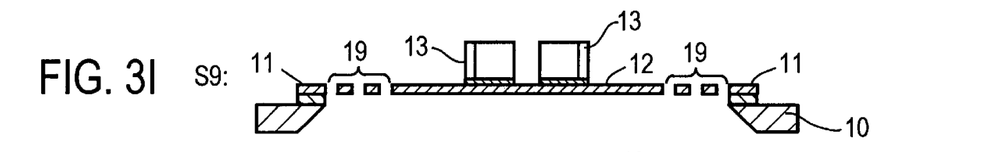
FIG. 3I is a sectional view for explaining a ninth step of the movable electrode plate assembly manufacturing operation process.
Figure 3J:
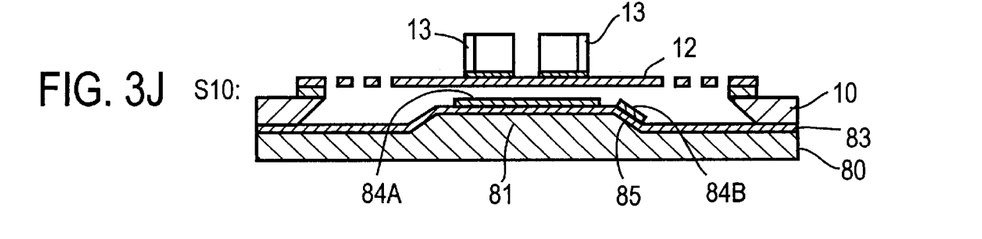
FIG. 3J is a sectional view for explaining a tenth step of the movable electrode plate assembly manufacturing operation process.
Figure 4A:
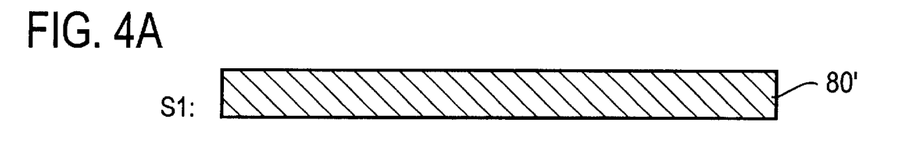
FIG. 4A is a sectional view showing a first step of a manufacturing operation process of a stationary electrode substrate (80) assembly of the microminiature movable device according to the present invention.
Figure 4B:
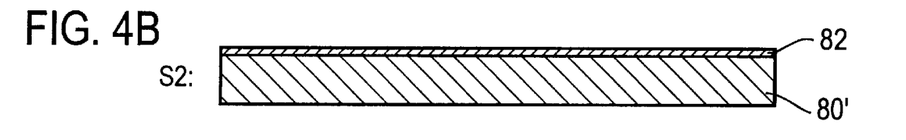
FIG. 4B is a sectional view showing a second step of the stationary electrode substrate assembly manufacturing operation process.
Figure 4C:
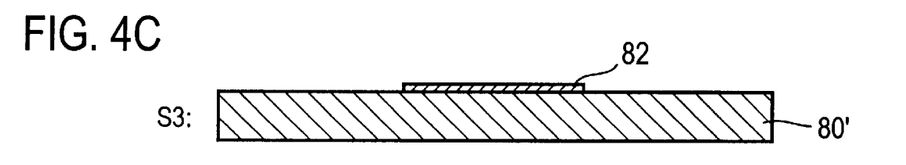
FIG. 4C is a sectional view showing a third step of the stationary electrode substrate assembly manufacturing operation process.
Figure 4D:
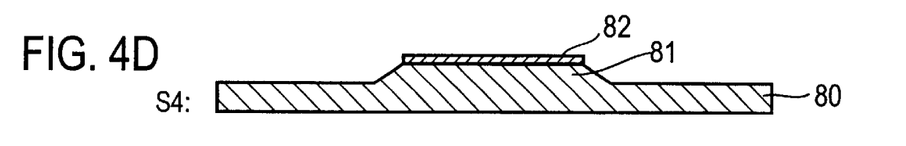
FIG. 4D is a sectional view showing a fourth step of the stationary electrode substrate assembly manufacturing operation process.
Figure 4E:
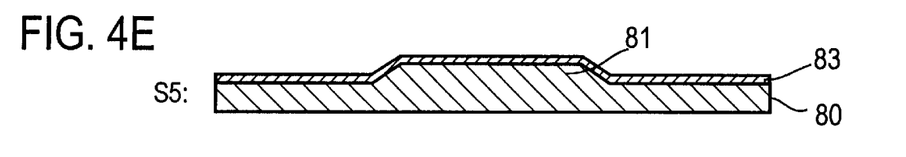
FIG. 4E is a sectional view showing a fifth step of the stationary electrode substrate assembly manufacturing operation process.
Figure 4F:
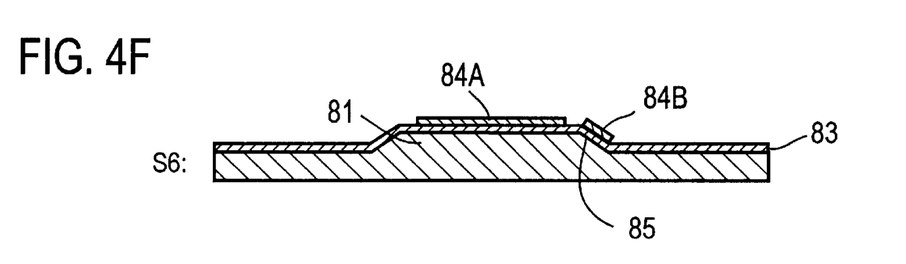
FIG. 4F is a sectional view showing a sixth step of the stationary electrode substrate assembly manufacturing operation process.

The stationary electrode 84A and the auxiliary electrode 84B are formed in the area where they are opposed to the movable electrode plate 12 as depicted in FIG. 3J.

Figure 5A:
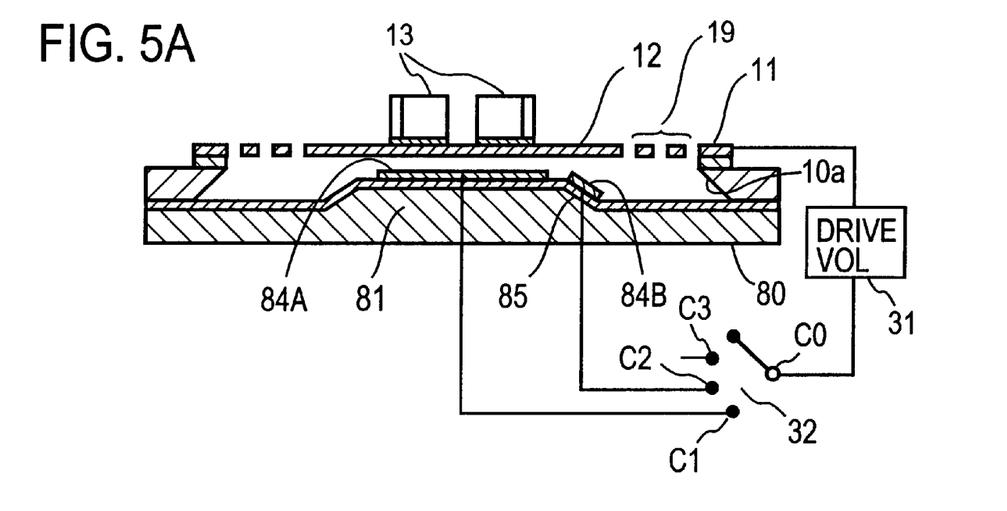
FIG. 5A is a sectional view illustrating an embodiment of the microminiature movable device according to the present invention.

FIG. 5A illustrates a drive circuit for driving the movable electrode plate 12 into engagement with and disengagement from the stationary electrode 84A and the auxiliary electrode 84B. The drive circuit comprises a drive voltage source 31 and a switch 32 for switching its one pole between the stationary electrode 84A and the auxiliary electrode 84B. The other pole of the voltage source 31 is connected to the movable electrode plate 18 via one of the anchor parts 11. The switch 32 has its fixed contacts C1 and C3 connected to the stationary electrode 84A and the auxiliary electrode 84B, respectively, and has its another fixed contact held floating. A movable contact C0 can be connected selectively to any one of the fixed contacts C1, C2 and C3.

In FIG. 5A the stationary electrode 84A is formed on the top of the central protrusion 81, and one auxiliary electrode 84B is formed on the central protrusion sloping face 85 right under the one of the flexures 19. Upon voltage application across the stationary electrode 84A and the movable electrode plate 14 from the drive voltage source 31 by connecting the movable contact C0 of the switch 32 to the fixed contact C1, an electrostatic attractive force is produced between the stationary electrode 84A and the movable electrode plate 12, by which the latter is attracted into contact with the former.

Figure 5B:
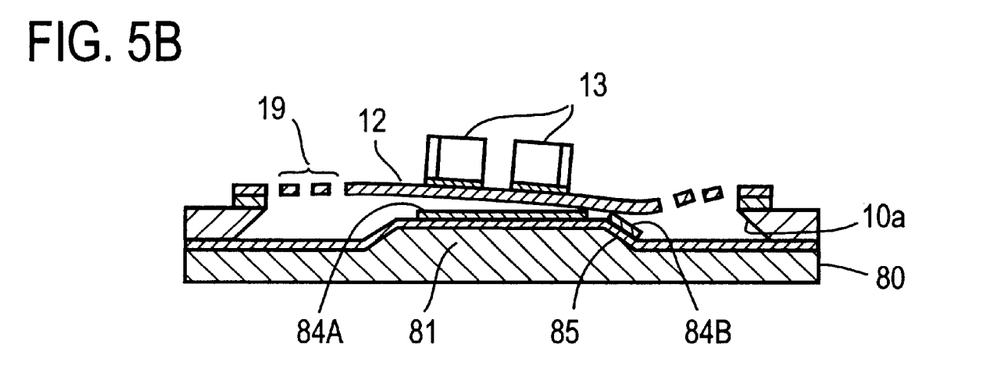
FIG. 5B is a sectional view for explaining the operation of the FIG. 5A embodiment.

In the case of restoring the microminiature movable device to the steady state, the removal of applied voltage from the stationary electrode 84A by switching the switch 32 to the fixed contact C3 will not immediately release the engagement between the movable electrode plate 12 and the stationary electrode 84A as referred to previously. To facilitate their disengagement, according to the present invention, the voltage applied across the movable electrode plate 12 and the stationary electrode 84A is removed by switching the movable contact C of the switch 32 from the fixed contact C1 to C2 and, at the same time, a voltage is applied across the movable electrode plate 12 and the auxiliary electrode 84B, with the result that the movable electrode plate 12 is attracted at one side to the auxiliary electrode 84B on the central protrusion sloping face 85 as shown in FIG. 5B. This attractive force is applied as restoring force to the side of the movable electrode plate 12 opposite the auxiliary electrode 84B. Since the restoring force is added to the elastic restoring force of the corresponding flexure 19, the movable electrode plate 12 begins to disengage from the stationary electrode 84A first at the side opposite the auxiliary electrode 84B, and switching of the switch 31 to the fixed contact C3 at this time will cause ensure the movable electrode plate 12 to easily disengage in its entirety from the stationary electrode 84A.

As described above, even if the movable electrode plate 12 adheres to the top surface of the stationary electrode 80 and will not immediately return to its normal position, the voltage application between the movable electrode plate 12 and the auxiliary electrode 84B deforms one portion of the former to release its engagement with the latter, and the immediately subsequent removal of the applied voltage by switching the movable contact C0 from the fixed contact C2 to C3 enables the microminiature movable device to return to the stead state.

Figure 5C:
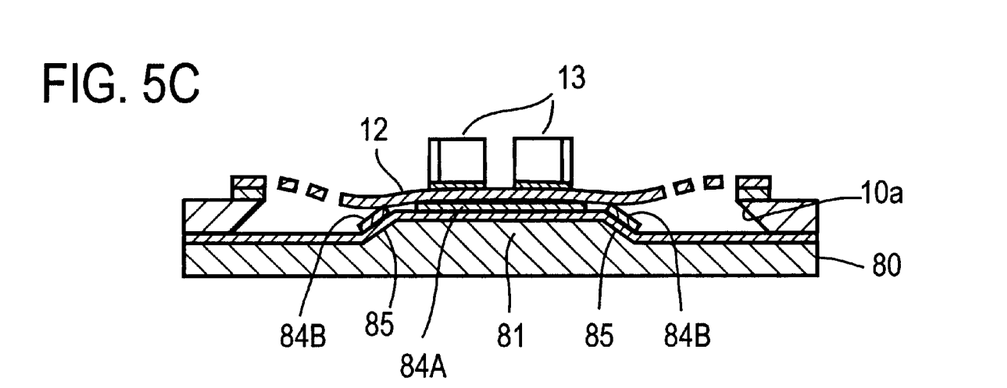
FIG. 5C is a sectional view for explaining another example of the operation of the above embodiment.

FIG. 5C illustrates another embodiment in which auxiliary electrodes 84B are formed symmetrically on opposite sides of the central protrusion sloping face 85. The two auxiliary electrodes 84B are electrically interconnected across the stationary electrode substrate 80 or around the switch 32. In this embodiment, when the movable electrode plate 12 is held in close contact with the stationary electrode 84A by connecting the movable contact C0 of the switch 32 to the fixed contact C2 to apply a voltage between them from the drive voltage source 31, the switch 32 is switched from the fixed contact C1 to C2 to apply a voltage to the auxiliary electrodes 84B, by which both side portions of the movable electrode plate 12 just above the auxiliary electrodes 84B are resiliently bent toward them as shown in FIG. 5C. Then, by switching the switch 32 from the fixed contact C2 to C3 to remove the applied voltage from the auxiliary electrodes 84B, the bent portions of the movable electrode plate 12 tend resiliently to go away from them, developing reaction forces to release the engagement of the movable electrode plate 12 with the stationary electrode 84A.

Alternatively, the two auxiliary electrodes 84B are connected to the fixed contacts C2 and C3, respectively. In this instance, the movable electrode plate 12 can be disengaged from the stationary electrode 84A, for example, by applying a voltage to the fixed contact C3, then applying a voltage to the fixed contact C3, and switching the switch 32 from the fixed contact C3 to another fixed contact (not shown) to remove the applied voltage from the auxiliary electrodes 84B. The movable electrode plate 12 can also be separated from the stationary electrode 84A by vibrating the letter by supplying the fixed contacts C2 and/or C3 with pulses of a frequency close to the resonance frequency of the movable portion including the flexures 19.

Figure 6A:
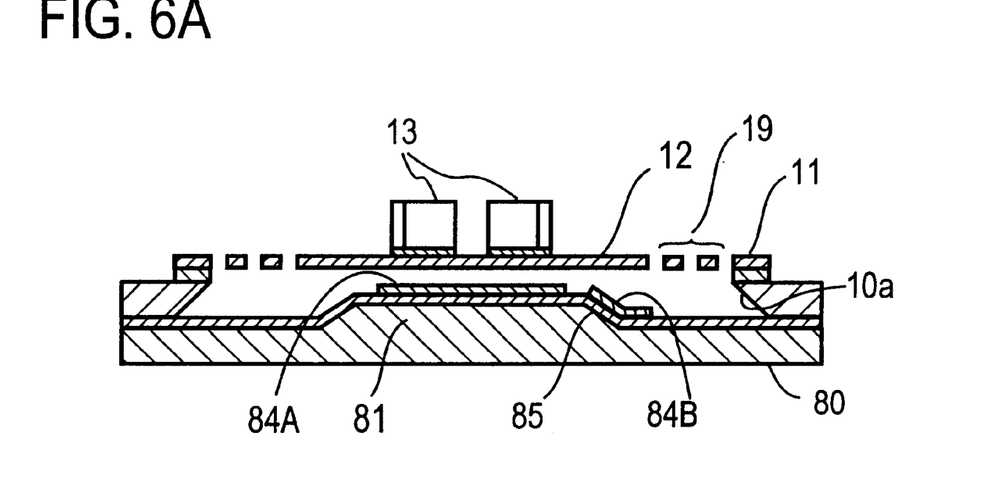
FIG. 6A is a sectional view showing another example of an auxiliary electrode 84B.
Figure 6B:
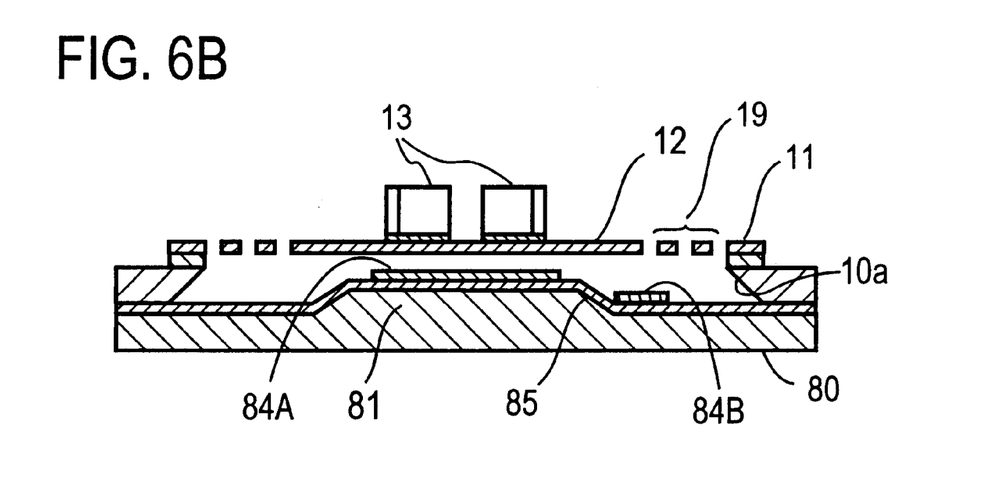
FIG. 6B is a sectional view showing still another example of the auxiliary electrode 84B.

While in the above the auxiliary electrodes or electrode 84 has been described to be formed on the central protrusion sloping face 85, the auxiliary electrode 84B may also be formed with its lower marginal portion lying off the edge of the slope 85 as depicted in FIG. 6A. Alternatively, the auxiliary electrode 84B may be formed outside the slope 85 as shown in FIG. 6B. As will be seen from the above, it is essential to the present invention that the auxiliary electrode 84B be lower in level than the stationary electrode 84A and be partly opposite the movable electrode plate 12.

A description will be given below of a concrete example of the microminiature movable device according to the FIG. 5A embodiment. The movable electrode plate 12 measures 500 by 500 $\mu$m and has a thickness of 5 $\mu$m. The central protrusion 81 has a height of 200 $\mu$m from the top surface of the stationary electrode substrate 80. The auxiliary electrode 84B measured 200 by 300 $\mu$m. The distance between the movable electrode plate 12 and the stationary electrode substrate 80 during the steady state is 80 $\mu$m. And the voltage of the drive voltage source 31 is set at 24 V With such settings, the microminiature movable device achieved excellent operations. The response speed of the movable electrode plate 12 during operation was approximately 5 msec.

The microminiature movable device of the present invention can be used as a sensor device like a semiconductor shock sensor and as an actuator device like an optical switch. Another example of the actuator device is an optical switch in which a movable plate having a mirror-polished surface is rotatable within a limited angular range about an axis parallel to the substrate surface and the direction of the mirror is changed to change the direction of the reflected light. A mirror device can be formed by a matrix of such optical scanners.

EFFECT OF THE INVENTION

As described above, according to the present invention, the adhering engagement between the movable electrode plate 12 and the stationary electrode substrate 80 during operation can easily be released by deforming the former through voltage application across the electrode plate 12 and the auxiliary electrode 84B additionally formed on the stationary electrode substrate 80 on which the stationary electrode 84A is formed.

What is claimed is:

1. A microminiature movable device comprising:
   a stationary electrode substrate having a centrally-disposed protrusion with a stationary electrode formed on its top;
   auxiliary electrode means formed on said stationary electrode substrate at a position adjacent said protrusion and at a level lower than said stationary electrode;
   a movable electrode part having an area opposite said stationary electrode and said auxiliary electrode means;
   at least two flexures resiliently supporting at one end said movable electrode part at at least two places of its marginal edge; and
   a support frame secured to said stationary electrode substrate, for fixedly supporting the other ends of said flexures to hold said movable electrode plate so that it can be engaged with or disengaged from said stationary electrode.

2. The device of claim 1, wherein said auxiliary electrode means is formed on said stationary electrode substrate in the neighborhood of at least one of said flexures.

3. The device of claim 1, wherein the marginal edge of said central protrusion merges into a sloping face and at least one part of said auxiliary electrode means lies on said sloping face.

4. The device of claim 1, wherein said auxiliary electrode means includes two auxiliary electrodes each formed on said stationary electrode substrate in the neighborhood of one of said two flexures.

5. The device of claim 1, further comprising: switch means for switching between said stationary electrode and said auxiliary electrode means; and a drive voltage source for applying a drive voltage between said movable electrode plate and that one of said stationary electrode and said auxiliary electrode means which is selected by said switch.

6. The device of claim 1, further comprising at least one micro-mirror formed on the top of said movable electrode plate.

7. The device of claim 2, further comprising at least one micro-mirror formed on the top of said movable electrode plate.

8. The device of claim 3, further comprising at least one micro-mirror formed on the top of said movable electrode plate.

9. The device of claim 4, further comprising at least one micro-mirror formed on the top of said movable electrode plate.

10. The device of claim 5, further comprising at least one micro-mirror formed on the top of said movable electrode plate.

* * * * *